(No Model.)
T. F. FLINN.
ANTI-FRICTION BEARING.
No. 386,698. Patented July 24, 1888.
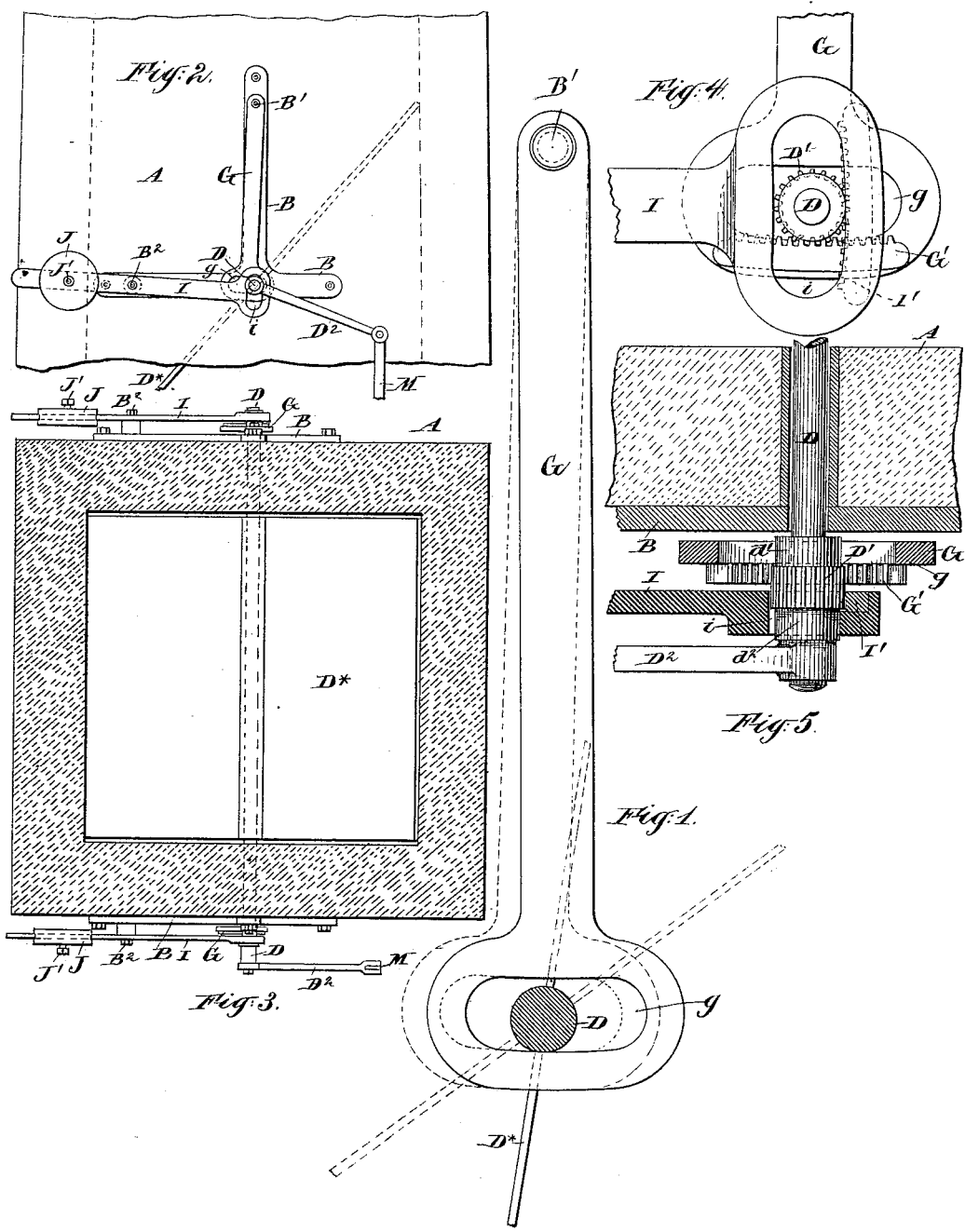
Witnesses:
Fred E. Tasker
Walter Allen
Inventor:
Thomas F. Flinn
by his attorney
Thomas Drew Stetson
N. PETERS, Photo-Lithographer, Washington, D. C.

UNITED STATES PATENT OFFICE.

THOMAS F. FLINN, OF BROOKLYN, NEW YORK.

ANTI-FRICTION BEARING.

SPECIFICATION forming part of Letters Patent No. 386,698, dated July 24, 1888.

Application filed October 11, 1886. Serial No. 215,854. (No model.)

*To all whom it may concern:*

Be it known that I, THOMAS F. FLINN, of Brooklyn, Kings county, in the State of New York, have invented a certain new and useful Improvement in Anti-Friction Bearings, of which the following is a specification.

The invention is intended for bearings for dampers in chimneys, especially of manufactories; but it may serve with success in other situations where the shaft does not rotate continuously, but rocks or makes partial revolutions in opposite directions.

The object, as in all anti-friction bearings, is to avoid or reduce friction. It is especially important in connection with devices for operating the damper automatically. Peculiar difficulties are involved in applying such mechanism to dampers, because the conditions forbid lubrication and require that the operation shall proceed without requiring attention. I have discovered that where, as in this work, the turning motion is never continuous in one direction, but is certain to be arrested after a partial revolution, and to turn to the same amounts in the aggregate in one direction as in the other, a very simple and durable device may serve. I have reduced it to practice. I provide a pendent link on the exterior of the chimney on each side, in the lower end of which is formed a curved transverse slot. The shaft of the damper extends through these slots, and the weight is supported by the links in such manner that as the shaft turns partially over in one direction or the other the links shift correspondingly and the damper turns to the required extent to completely open or close the flue without its shaft changing the position of its axis at all. To provide against lateral displacement, I provide horizontal links pivoted to points sufficiently to the right or left, and having their slots similarly curved and similarly receiving the shaft of the damper. The gravity of these links can be approximately balanced by counter-weights fixed on extensions in the obvious manner. In the most complete form of the invention I insure the correct positions of both sets of links by racks and pinions.

The accompanying drawings form a part of this specification, and represent what I consider the best means of carrying out the invention.

Figure 1 is a side view of the vertical links, with a cross-section of the shaft of the damper extending through the slot therein. The links and shaft are shown plain or without teeth. I believe the invention can be worked with some success in this condition. The dotted lines show the changed position of the damper and of the link when the damper has been turned about an eighth of a revolution. It will be observed that the shaft does not move to one side or the other as it turns. Such motion is by the link alone. Fig. 2 is a side elevation on a smaller scale, showing both the vertical and the horizontal links, and also the casting which supports their centers, but still omitting the gearing, by which I mean the pinions on the shaft and the racks, on the links. Fig. 3 is a horizontal section through the chimney, with a plan view of the damper and of my anti-friction bearing on each side of the chimney. Fig. 4 is a detail of a portion on a larger scale in elevation. This shows the gear very clearly as applied to the vertical links and with but little less fullness as applied to the horizontal links. Fig. 5 is a corresponding horizontal section.

Similar letters of reference indicate corresponding parts in all the figures where they occur.

A is the chimney. B B are castings bolted thereto. D is the shaft of a damper, D*. The holes in the castings B and in the brick-work A are a little larger than the shaft D, so that the latter turns easily therein. On the shaft D, a little outside of each casting B, is a broad pinion, D'. A pivot, B', near the top of each casting B sustains a vertical link, G, which latter has in a lower and wide portion a transverse slot, $g$, curved, as shown. The shaft D extends through this slot and the weight of the entire damper is supported in the slots—the front end in the front link G and the back end in the back link, correspondingly lettered. The smooth portion of the shaft just within the pinion D', which rests on the bottom of the slot in each of these links G, is marked $d'$. (See Fig. 5.) Each link has a narrow rack, G', alongside the slot on the outer edge, in which rack the pinion D' engages. A pivot, B², is also set in each casting B. This pivot is at the level of the shaft D, but at considerable distance one side. This forms the axis for a balanced link, I, which is slotted like the link D and correspondingly provided with a narrow rack, I', which rack is also engaged by the pinion D'. The pinion D' is wide. Its inner edge—the part next the chimney A—engages the rack G' in the link G, while its outer edge—the part farthest from the chimney A—engages the rack I' in the link I. The smooth edge of the slot in each link receives the pressure of the bearing of the shaft, the link G receives in its slot $g$ the pressure of the smooth bearing $d'$, just within or nearer the chimney than the pinion D', and the link I receives in its slot $i$ the pressure of the smooth bearing $d^2$ just outside of or farther from the chimney than the pinion D'.

J is a weight secured by a pinching-screw, J', in an adjustable position on each link I. Its gravity being outside of the pivot $B^2$ balances the link I, so that it is easy for the pinion D', as it partially turns one way or the other, to move the slotted end of the link I up or down. It will allow the apparatus to serve with tolerable success without the racks I', or even without the racks G', and without the pinion D'.

On one end of the shaft D is fixed an arm, $D^2$, which is engaged by an operating-rod, M, which may be raised and lowered by hand or by any suitable means, as an automatic regulator, to turn the damper as required. My anti-friction bearings insure that the damper can be easily turned. The parts will endure any degree of heat to which they are liable to be exposed, and the operation is not seriously obstructed by any ordinary deposits of soot, ashes, or fine cinders. The mechanism requires no attention.

Parts of the apparatus may be used without the whole. I can dispense with the pinion D' and the corresponding racks, as above stated. I can dispense with the horizontal links I I' and allow the links G G' to serve as shown in supporting the gravity. Modifications can be made in forms of the parts. The castings B may be varied indefinitely or they may be omitted entirely, and the links may be centered on pins set directly in the brick-work of the chimney.

I claim as my invention—

1. In combination with a rocking shaft, D, the suspending-links G, having transverse slots $g$, and pivoted supports B', arranged to serve in supporting the weight of the damper and allowing it to turn with slight resistance by the shifting of the link, as herein specified.

2. The two sets of transversely-slotted links G and I, mounted in angular positions relatively to each other, in combination with supporting-pivots B' $B^2$ and with the rocking shaft D, arranged for joint operation in supporting the latter against displacement in any direction, as herein specified.

3. The racks G' in the transversely-slotted links G, in combination with the pivot B', rocking shaft D, and lever $D^2$, and rod M, for turning the latter, and with the pinion D', engaging said racks and insuring the correct position of the links relatively to the shaft, as herein specified.

In testimony whereof I have hereunto set my hand, at New York city, New York, this 8th day of October, 1886, in the presence of two subscribing witnesses.

T. F. FLINN.

Witnesses:
CHARLES R. SEARLE,
M. FREEMAN BOYLE.